(12) United States Patent
Brinkmoeller et al.

(10) Patent No.: US 7,536,423 B2
(45) Date of Patent: May 19, 2009

(54) PROCESSING DATA OBJECTS

(75) Inventors: Bernhard Brinkmoeller, Wiesloch (DE); Axel Herbst, Eppingen (DE); Georg Fischer, Walldorf (DE); Ulrich Marquard, Bad Schoenborn (DE)

(73) Assignee: SAP Aktiengesellschaft, Walldorf (DE)

( * ) Notice: Subject to any disclaimer, the term of this patent is extended or adjusted under 35 U.S.C. 154(b) by 528 days.

(21) Appl. No.: 10/308,224

(22) Filed: Dec. 2, 2002

(65) Prior Publication Data
US 2003/0131014 A1 Jul. 10, 2003

Related U.S. Application Data

(60) Provisional application No. 60/341,851, filed on Dec. 21, 2001.

(51) Int. Cl.
G06F 17/00 (2006.01)
(52) U.S. Cl. ............... 707/204; 707/203; 707/102; 707/101
(58) Field of Classification Search ............ 707/3, 707/101–104.1, 1, 203, 204; 715/523, 516
See application file for complete search history.

(56) References Cited

U.S. PATENT DOCUMENTS

| 5,815,718 | A * | 9/1998 | Tock ............... 717/166 |
| 6,330,574 | B1 | 12/2001 | Murashita |
| 6,466,942 | B1 | 10/2002 | Tolkin |
| 6,510,434 | B1 | 1/2003 | Anderson et al. |
| 6,658,625 | B1 * | 12/2003 | Allen ............... 715/523 |
| 6,691,309 | B1 | 2/2004 | Lorie |
| 6,883,137 | B1 | 4/2005 | Girardot et al. |
| 2001/0056429 | A1 | 12/2001 | Moore et al. |
| 2002/0161745 | A1 * | 10/2002 | Call ............... 707/1 |
| 2002/0169744 | A1 | 11/2002 | Cooke et al. |
| 2002/0169792 | A1 | 11/2002 | Perinet et al. |

FOREIGN PATENT DOCUMENTS

| EP | 1 324 215 A1 | 7/2003 |
| WO | 01/73611 A2 | 10/2001 |

OTHER PUBLICATIONS

Java Architecture for XML Binding, Sun 1994-2005.*
Java Technology and XML-Part One, Sun, 1994-2005.*
What's New in Java Language Conversion Assistance 3.0.*
Interaction Translation Methods for XML/SNMP Gateway.*
Java Architecture for XML Binding.*
Reagan Moore et al., "Collection-Based Persistent Digital Archives—Part 1", D-Lib Magazine, Corporation for National Research Initiatives, Reston, VA, vol. 6, No. 3, Mar. 2000, pp. 1-13.

(Continued)

Primary Examiner—Sana Al-Hashemi
(74) Attorney, Agent, or Firm—Fish & Richardson P.C.

(57) ABSTRACT

Methods and apparatus, including computer program products, for processing data objects having data items. The method includes classifying each data object into a write-enabled object or a read-only object, storing write-enabled data objects in a database, and archiving read-only data objects. The archiving includes converting the data objects to markup objects, wherein each markup object represents the data items of the corresponding data object, concatenating the markup objects to a single data structure that is byte addressable, and indexing object identification for each markup object to addresses of the data structure.

40 Claims, 9 Drawing Sheets

OTHER PUBLICATIONS

Peter Buneman et al., "Keys for XML", Proceedings 10th WWW Conference, ACM, May 1-5, 2001, pp. 201-210.

Wireless Application Protocol Forum: WAP Binary XML Content Format Document ID WAP-192-WBXML-20000515 Version 1.3, May 15, 2000, pp. 1-25.

R. Schaarschmidt et al.; "Datenbankbasiertes Archivieren im SAP System R/3"; Wirtschaftsinformatik, vol. 39, No. 5; Oct. 1997; pp. 469-477.

English translation of Desig. AQ—R. Schaarschmidt et al.; "Database-based Archiving in the SAP System R/3"; Wirtschaftsinformatik, vol. 39, No. 5; Oct. 1997; pp. 469-477.

R. Schaarschmidt et al.; "An Architecture for Archives in Database Systems"; Forschungsergebnisse der Fakultät für Mathematik und Informatik; Nr. Math/Inf/98/18; pp. 1-24; Friedrich-Schiller-Universität Jena; Jun. 1998.

R. Schaarschmidt et al.; "Konzepte und Implementierungsaspekte anwendungsorientierten Archivierens in Datenbanksystemen"; Informatik-Forschung und Entwicklung; vol. 13, No. 2; Jun. 1998; pp. 79-89; Springer Verlag Berlin/Heidelberg.

English translation of Desig. AT-R. Schaarschmidt et al.; "Concepts and Implementation Aspects of Application-oriented Archiving in Database Systems"; Informatik-Forschung und Entwicklung; vol. 13, No. 2; Jun. 1998; pp. 79-89; Springer Verlag Berlin/Heidelberg.

Summons to Attend Oral Proceedings Pursuant to Rule 71(1) EPC issued in corresponding European Application No. 02001322.3 on Jul. 17, 2006; 10 pages.

Liefke, Hartmut, et al., "XMill: An Efficient Compressor for XML Data," 2000, ACM Press, 1-58113-218-2/00/05, pp. 153-164.

Ludaescher, Bertram, et al., "Preservation of Digital Data with Self-Validating, Self-Instantiating Knowledge-Based Archives," Sep. 2001, ACM Press, vol. 30, No. 3, pp. 54-63.

Waugh et al., "Preserving Digital Information Forever," 2000, ACM Press, 1-58113-231-X/00/0006, pp. 175-184.

* cited by examiner

DATA OBJECT 34

| | DATA ITEMS 36 | |
|---|---|---|
| OID 38 | NAME 36-1 | PHONE 36-2 |
| | | |
| 2 | BETA | 123 456 |
| | | |

DATA STRUCTURE 46

A 48

| Address | | Label |
|---|---|---|
| 0001 | | I 250 |
| 00... | | |
| 0050 | | |
| 0051 | | D 260 |
| 00... | | |
| 0100 | | |
| 0101 | 50  LID 64-1 | |
| 0101 | | CO 62-1 |
| 0102 | | |
| 01... | ⋮ | |
| 0150 | | |
| 0151 | 18  LID 64-2 | |
| 0152 | | CO 62-2 |
| 01... | ⋮ | |
| 0168 | | |
| 0169 | 40  LID 64-3 | |
| 0170 | | CO 62-3 |
| 0171 | | |
| 01... | ⋮ | |
| 0208 | | |

DATA STRUCTURE 60

FIG. 8

PROCESSING DATA OBJECTS

CROSS-REFERENCE TO RELATED APPLICATIONS

This application claims priority to U.S. Provisional Application No. 60/341,851, entitled SYSTEMS AND METHODS FOR ELECTRONICALLY ARCHIVING AND RETRIEVING DATA OBJECTS DIRECTLY TO AND FROM DATA STRUCTURES, filed Dec. 21, 2001 and European Patent Application No. 02001322.3, filed Jan. 18, 2002. The disclosures of the above applications are incorporated herein by reference in their entirety.

TECHNICAL FIELD

This invention relates to computing, and more particularly to processing data objects.

BACKGROUND

Public and private organizations such as companies or universities electronically access data by computers that implement applications, databases and archives. Data is information that is translated into a form that is convenient to move or process. Data is usually structured and represented by data objects, such as sales orders, financial documents and/or business partner master data For example, a company stores business documents such as orders and invoices that have separate data object representations for address, product, currency, or monetary amount. Typically, applications write and read the data objects to and from the database.

SUMMARY

The present invention provides methods and apparatus, including computer program products, which can be used in processing data objects.

In one aspect, the invention features a method for processing data objects having data items. The method includes classifying each data object into a write-enabled object or a read-only object, initially selectively storing write-enabled data objects in a database, and archiving read-only data objects in an archive, an original home of the read-only data objects being in the archive. The archiving includes converting the data objects to markup objects, wherein each markup object represents the data items of the corresponding data object, concatenating the markup objects to a single data structure that is byte addressable, and indexing object identification for each object to addresses of the data structure.

One or more of the following advantageous features can be included. Classifying can be performed while generating the data objects in a data exchange process by an application system. The markup objects can include Extensible Markup Language (XML) objects. Converting further can include encoding numerical data items by character code. Converting can also include adding code identification to markup objects and the code identification can be MIB numbers.

In embodiments, converting can also include compressing the markup objects to compressed objects with length identification. Indexing can include adding a descriptor representing the semantics of the data items in the markup objects to the data structure. The descriptor can be a document type definition (DTD) schema or an XML schema. Storing can also include converting, concatenating and indexing in connection with the database.

In another aspect, the invention features a method for archiving data objects having data items including converting the data objects to markup objects, wherein each markup object represents the data items of the corresponding data object, concatenating the objects to a single data structure that is byte addressable, and indexing object identification for each object to addresses of the data structure.

One or more of the following advantageous features can be included. The markup objects can be XML objects. Converting can include encoding numerical data items by character code and/or adding code identification to markup objects. The code identification can be represented by MIB numbers for character sets.

In embodiments, converting can also include compressing the markup objects to compressed objects with length identification. The data structure can include a descriptor representing the semantics of the data items in the markup objects, and the descriptor can be a DTD schema or an XML schema.

The details of one or more embodiments of the invention are set forth in the accompanying drawings and the description below. Other features and advantages of the invention will be apparent from the description and drawings, and from the claims.

DESCRIPTION OF DRAWINGS

FIG. 8 is a block diagram of a data structure with concatenated compressed objects.

DETAILED DESCRIPTION

Figure 1:
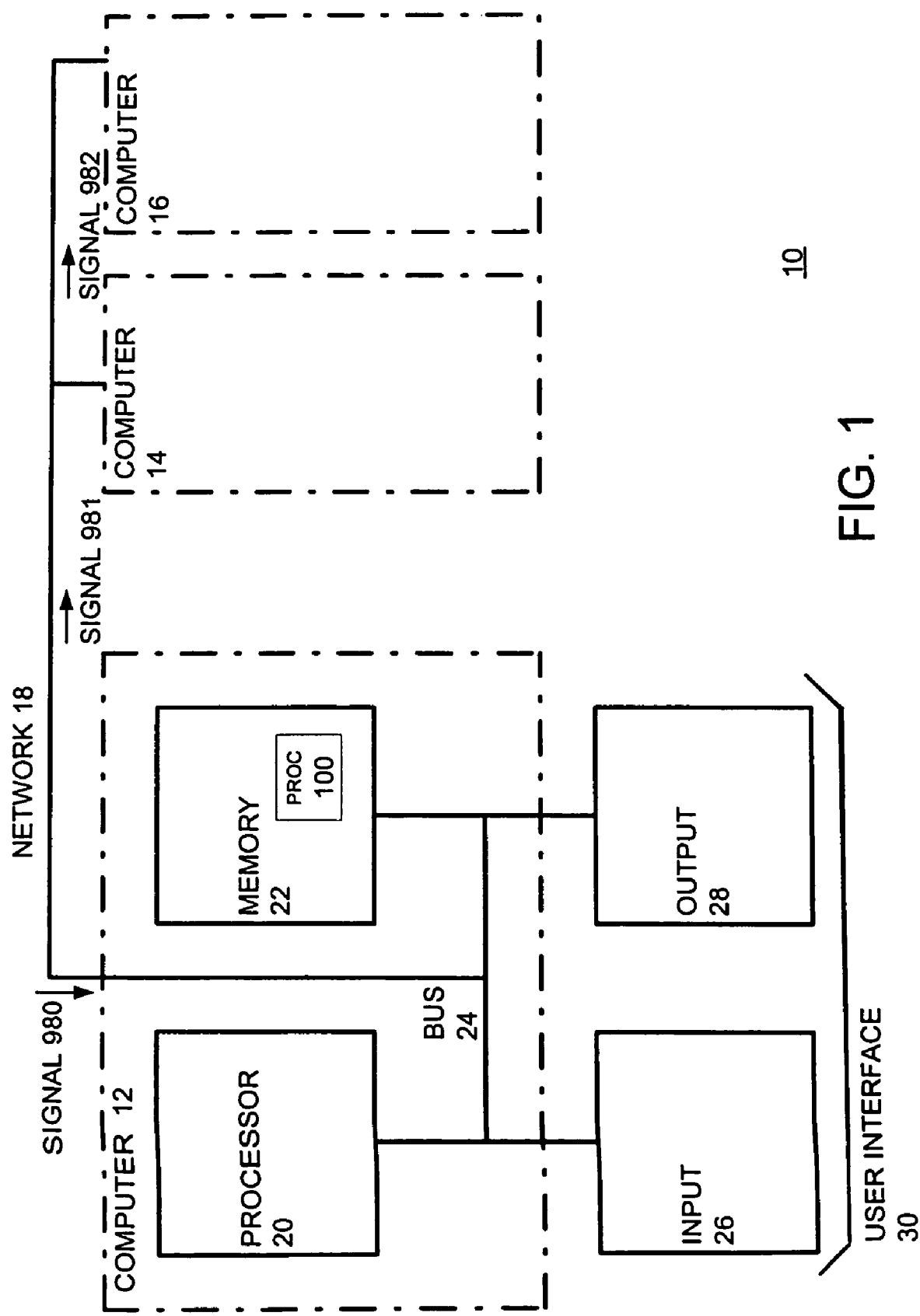
FIG. 1 is a block diagram of a network environment.

As shown in FIG. 1, an exemplary network environment 10 includes computer systems 12, 14 and 16. Computer systems 12, 14, 16 are coupled over inter-computer network 18. Each of the computer systems 12, 14, 16, computer system 12, for example, includes a processor 20, memory 22, bus 24, and, optionally an input device 26 and an output device 28. Devices 26,28 are generally referred to a user interface (UI) 30. Memory 22 includes a process 100 for handling data objects with data items, fully described below.

In the environment 10, by way of example, computer system 12 is referred to an archive/retrieve system, computer system 14 is referred to as an application computer system and computer 14 is referred to a database computer system. In this example, process 100 executes within archive/retrieve system 12.

The following terms are helpful in describing an example. "Retrieve" refers to reading objects from an archive.

"Data object (DO)" refers to structured data provided by an application.

"Markup object (MO)" refers to an object in markup language. "Compressed object (CO)" refers to an object in a compressed form.

"Descriptor" refers to any schema that indicates a semantic of the markup language.

"File" refers to a data structure with addressable bytes.

"Byte" refers to a smallest unit of information that is discussed herein, usually having a length of eight bits.

Figure 2:
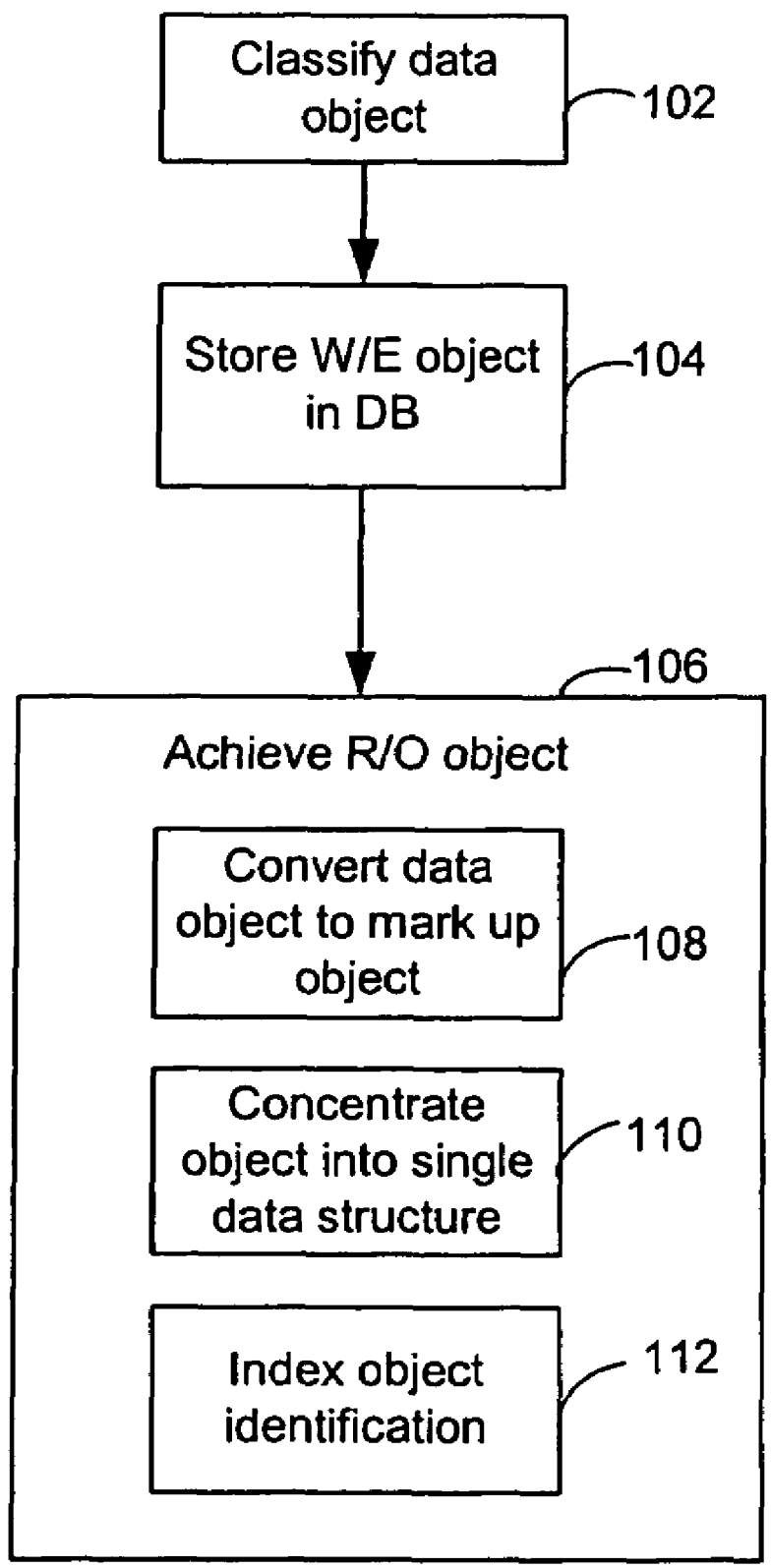
FIG. 2 is flowchart of the process for handling a number of data objects with data items.

As shown in FIG. 2, the process 100 for handling data objects with data items includes classifying (102) each data object into a write-enabled (W/E) object or a read-only (R/O) object. An "R/O object" cannot be modified by a user or a process, while a "W/E object" can be modified byte user or process. For each object, process 100 selectively stores (104) write-enabled data objects in a database or archives (106) read-only data objects.

Archiving (106) includes converting (108) the data objects to markup objects, wherein each markup object represents data items of the corresponding data object. Archiving (106) includes concatenating (110) the objects to a single data structure that is byte addressable and indexing (112) object identification of each markup object to addresses of the data structure.

Storing (104) operates similar to archiving (106), i.e., by converting, concatenating and indexing objects to the database.

Figures 3, 4:
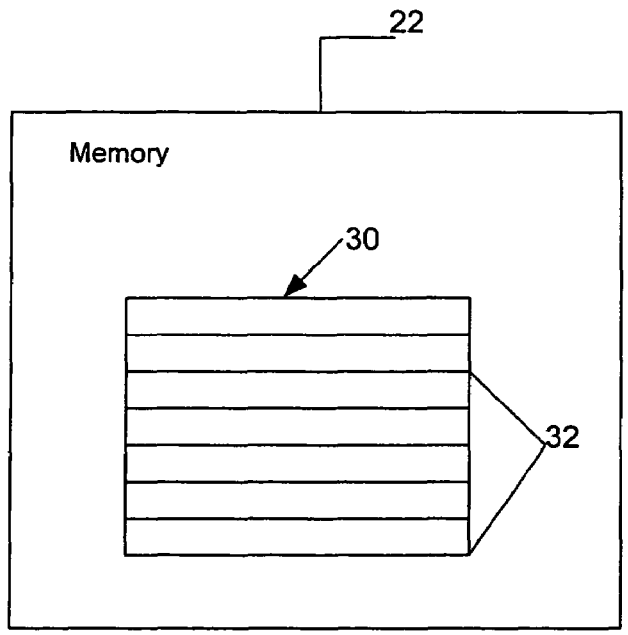
FIG. 3 is a block diagram of byte-addressable memory.
FIG. 4 is a block diagram of a data object.

In FIG. 3, memory 22 is shown with memory portions 30 and data structure 32. Memory portions 30 are byte addressable. Memory 22 includes data structure 32. Data structure 32 is byte addressable.

In FIG. 4, an exemplary data object (DO) 34 is shown. Data object 34 includes data items 36 and is identified by object identification (OID) 38. For convenience of explanation, a phone list is used as an example. Application computer system 14 and database computer system 16 use a table with "name" and "phone" columns (data items 36-1 and 36-2, respectively). The exemplary data object 34 is the entry with the name "BETA" (item 36-1) and the phone number "123 456" (item 36-2).

A data object, such as data object 34, originates from a data exchange process in an application (e.g. incoming contract documents, catalog items requested), or the data object originates from a user interaction that does not allow any change after a committed input, such as an internet sales order, bidding at an auction, or selling shares of stock.

Figure 5:
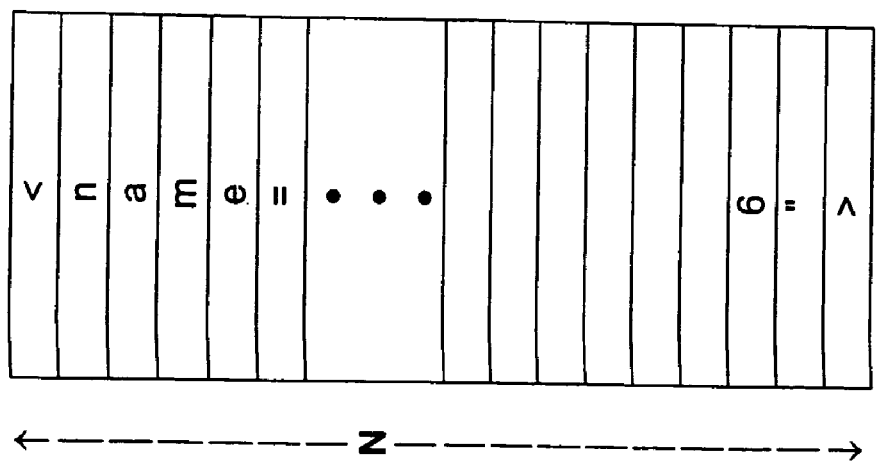
FIG. 5 is a block diagram of a markup object.

In FIG. 5, an exemplary markup object (MO) 40 is shown. Markup object 40 represents data items 36 of the corresponding data object 34. More specifically, markup object 40 is obtained by one-to-one conversion of data item 36-1 and data item 36-2 of the data object 34. An example markup language is eXtended Markup Language (XML). The markup language reads as <name ="BETA" phone="123 456"> with data items 36 (e.g., BETA, 123 456) and tag identifiers. FIG. 5 illustrates markup object 40 as bytes, where the number of bytes N is thirty. Alternatives for the tag identifiers are, for example, <name>BETA</name> and <phone>123 456</phone>.

Figure 6:
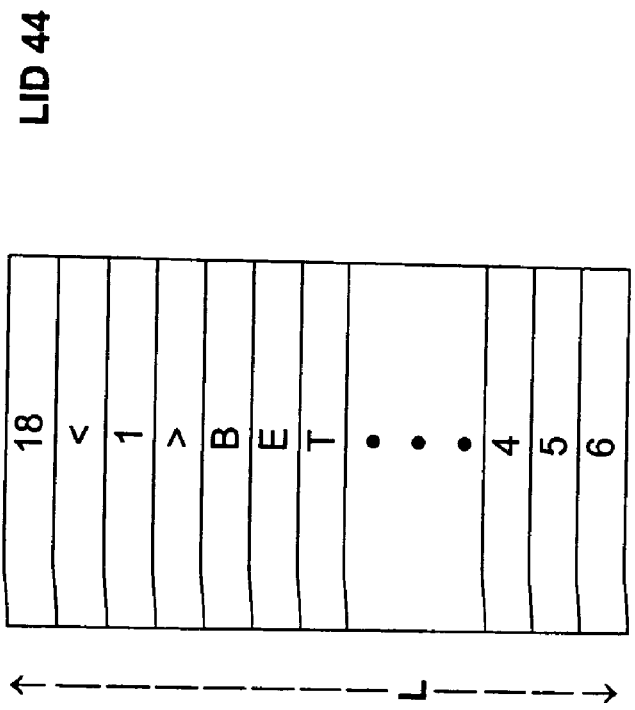
FIG. 6 is a block diagram of a compressed object.

In FIG. 6, an exemplary compressed object (CO) 42 is shown. In the example, tag identifiers of FIG. 5 have been compressed to <1>and <2>, whereas data items 36 are not compressed. The number of bytes N is reduced from thirty to eighteen by using the CO 42 rather than the MO 40. The first byte indicates by the CO 42 length L by length identification (LID) 44. Other compression techniques can be utilized, such as Huffmann coding.

Figure 7:
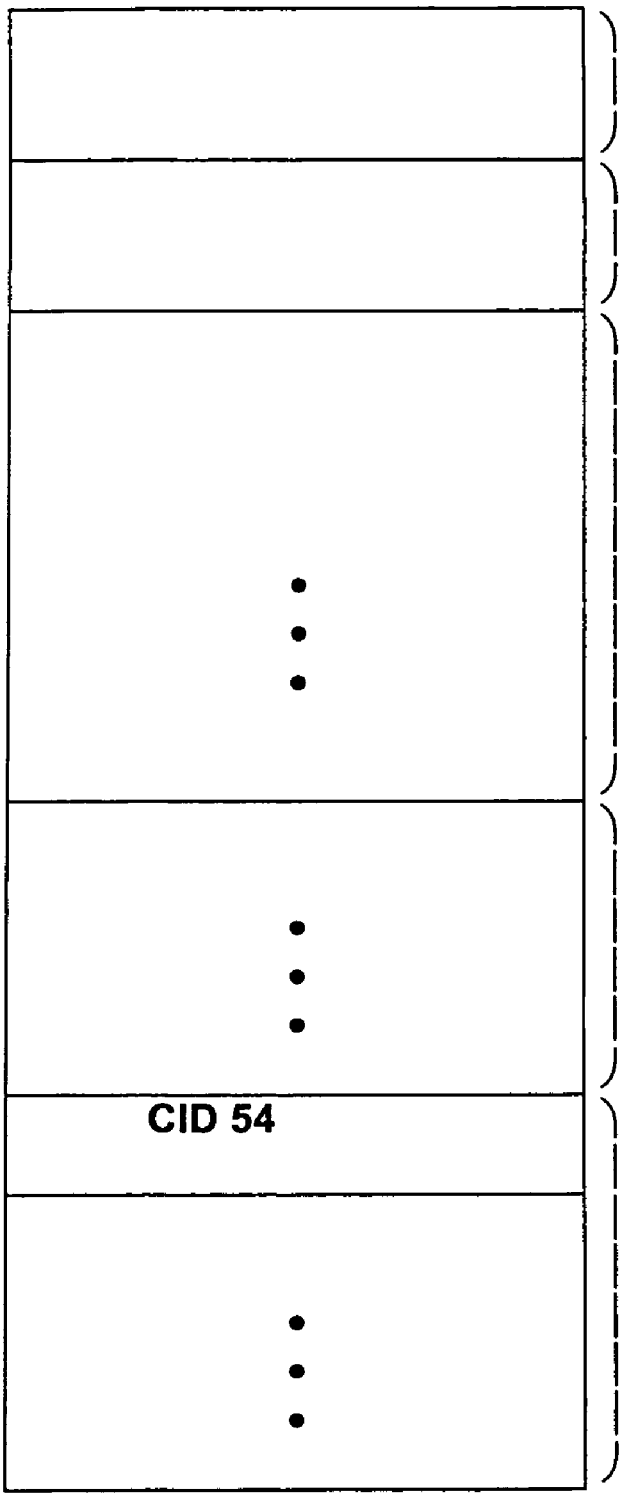
FIG. 7 is a block diagram of a data structure with concatenated markup objects.

In FIG. 7, a data structure 46 is shown with concatenated markup objects (MO) 46-1, 46-2 and 46-3. For convenience, exemplary byte addresses (A) 48 are indicated on the left side. Decimal numbers are used for counting in this example. Index (I) 50 and descriptor (D) 52 have addresses 0001 to 0050 and 0051 to 0100, respectively. Markup object 46-1 has N=100 bytes at addresses 0101-0200; markup object 46-2 has N=30 bytes at addresses 0201-0230; markup object 46-3 has N=70 bytes at addresses 0231-0300.

Index 50 is a control block for storing an OID to A assignment such as OID 38 to A 48. More specifically, object identification OID =1 (for MO 46-1) is indexed to A=0101; OID =2 (for MO 46-2) is indexed to A=0201; and OID =3 (for MO 46-3) is indexed to A=0231. The descriptor D 52 represents semantics of data items 36 in markup objects 40, for example, by stating that tag identifiers of FIG. 5 represent name and phone number.

In another example, two or more markup objects are coded by different character sets. Character sets are standardized by organizations, such as ISO and JIS, or companies. For example, markup objects 46-1 and 46-2 use Latin, but markup object 46-3 uses Cyrillic (or Greek, Chinese, Japanese, Korean or Arabic. FIG. 7 also includes code identification (CID) 54 for markup object 46-3 at addresses 0231-0232.

The present method can distinguish character sets for each object. CID 54 can be represented by text or by numbers. An Internet Assigned Numbers Authority (IANA) identifies character sets by unique integer numbers, referred to as MIB (Management Information Base) numbers. Using such a standard is convenient because code identification (CID) is interpretable without any further information. For example, CID 54 (for MO 46-3) is MIB "2084", represented by the bit patters 00001000 and 00100100 at the mentioned addresses.

A management information base (MIB) is a formal description of a set of network objects that can be managed using the Simple Network Management Protocol (SNMP). The format of the MIB is defined as part of the SNMP. All other MIBs are extensions of this basic management information base. MIB-I refers to the initial MIB definition; MIB-II refers to the current definition. SNMPv2 includes MIB-II and adds some new objects. There are MIBs (or more accurately, MIB extensions) for each set of related network entities that can be managed.

IANA (Internet Assigned Numbers Authority) is the organization under the Internet Architecture Board (IAB) of the Internet Society that, under a contract from the U.S. government, oversees the allocation of Internet Protocol addresses to Internet service providers (ISPs). IANA also has had responsibility for the registry for any "unique parameters and protocol values" for Internet operation. These include port numbers, character sets, and MIME media access types.

In FIG. 8, a data structure 60 with concatenated compressed objects (CO) 62 is shown. Data structure 60 is byte addressable. The objects are compressed objects (CO) 62 each having length identification (LID) 64. For example, MO 46-1 with N=100 bytes is compressed to CO 62-1 with L=50 bytes; MO 46-2 with N=30 bytes is compressed to CO 62-2 with L=18 bytes; and MO 46-3 with N=70 bytes is compressed to CO 62-3 with L=40 bytes. Length identification 64 indicates a length for each CO at the beginning address of each CO.

Figure 9:
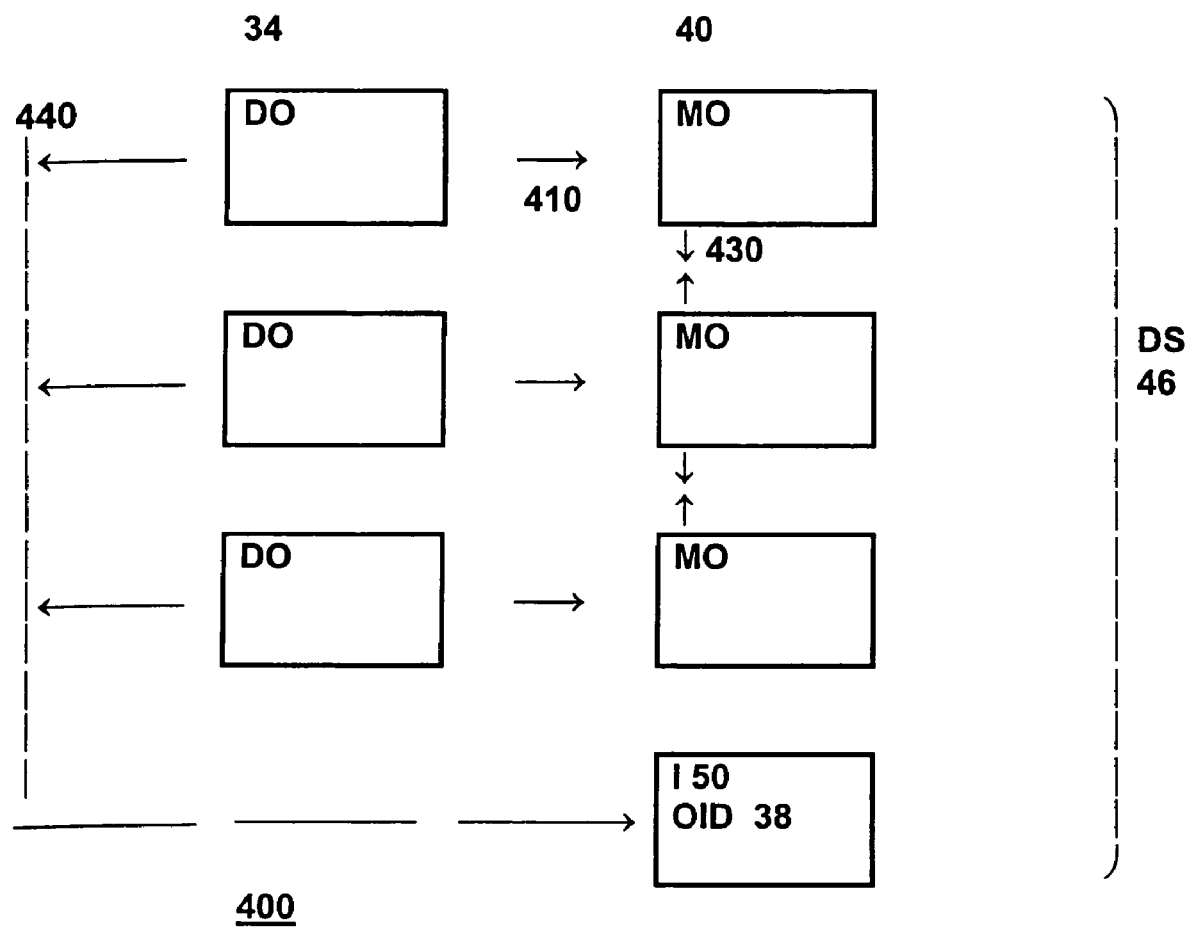
FIG. 9 is an overview for archiving by data objects, markup objects, data structure and index.

In FIG. 9, an overview for archiving (400) by data objects (DO) 34, markup objects (MO) 40, data structure (DS) 46 and index (I) 50, as well as arrows for converting (410), concatenating (430) and indexing (440) are shown. Index (I) 50 stores object identification (OID) 38 with corresponding addresses 48 of data structure 46 for each markup object 40.

Figure 10:
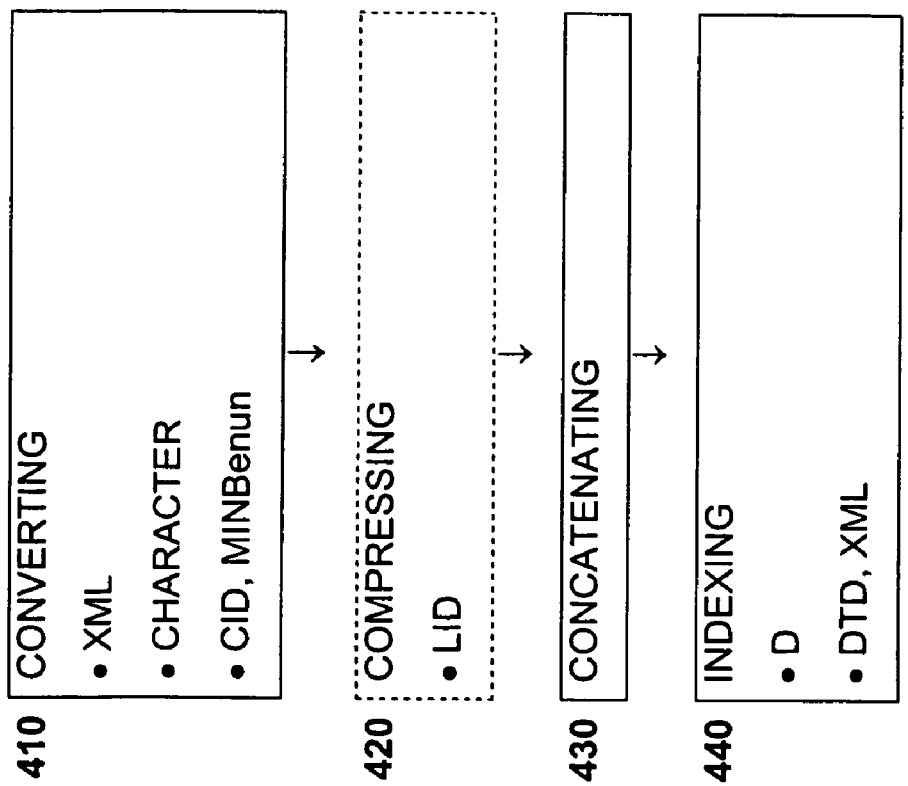
FIG. 10 is a flowchart for archiving.

In FIG. 10, a flowchart for archiving (400) is shown. Archiving (400) includes converting (410) and compressing (420). Archiving (400) includes concatenating (430) objects to a data structure (byte addressable) and indexing (440) object identification for each markup object to addresses (A) of the data structure. Prior to concatenating (430), archiving (400) converts (410) the data objects to markup objects, wherein each markup object represents data items of a corresponding data object.

During converting (410), markup objects are provided in XML. Numerical data items are encoded by character code. For example, the real number "2.5" is coded to a character-only string with the character "2", the period character, and the character "5". During converting (410), code identification (CID) is added to some or all markup objects. During converting (410), code identification is represented by MIB numbers.

After converting (410) but prior to concatenating (430), compressing (420) compresses markup objects (MO) to compressed objects (CO) with length identification (LID) so that compressed objects are concatenated (430) to the data structure.

During indexing (440), descriptor (D) is added to the data structure. The descriptor represents the semantics of the data items in the markup objects. The descriptor is formulated in a Document Type Definition (DTD) schema or in a XML schema.

Storing the data structure to media is performed during or after performing archiving (400). The index is optionally stored in an index database separate from the data structure. This enhances efficiency. To ensure interpretability, the descriptor is stored as part of the data structure.

Figure 11:
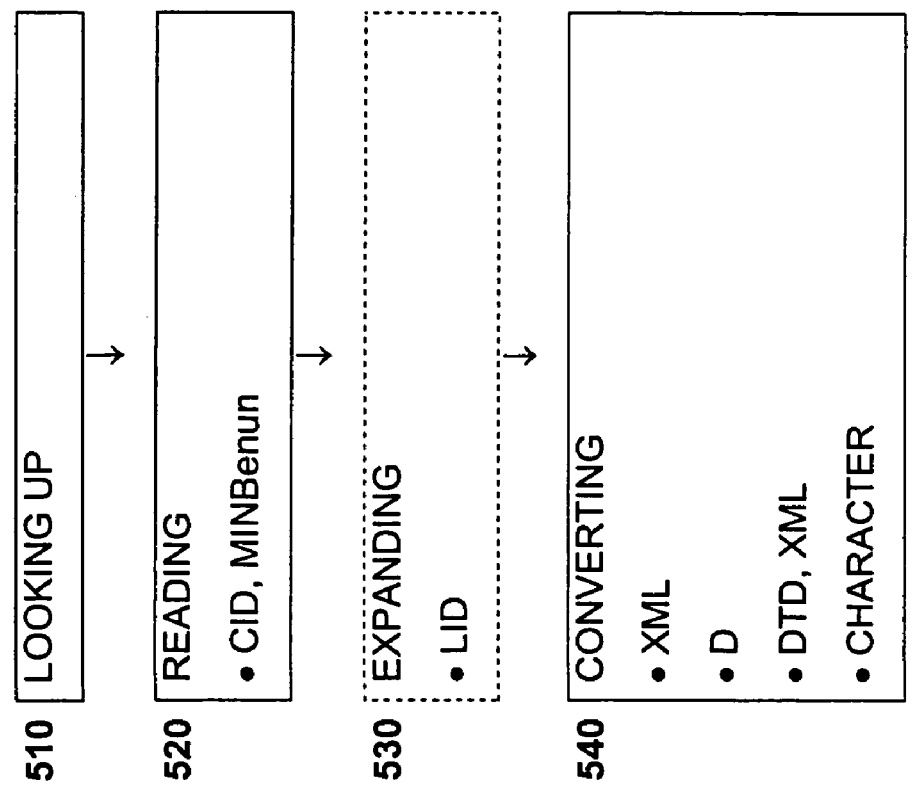
FIG. 11 is a flowchart for retrieving.

FIG. 11 shows a flowchart of a process for retrieving (500) data objects that includes looking up (510) the address (A) in data structure or index database that corresponds to the object identification, reading (520) a markup object at an address (A), converting (540) the markup object to a data object, wherein the markup object represents data items of a corresponding data object. Prior to converting (540), a compressed object (CO) is expanded (530) to a markup object (MO) by reading length identification (LID) and reading compressed object (CO) as a number of bytes (i.e. L byte) given by length identification (LID).

Figure 12:
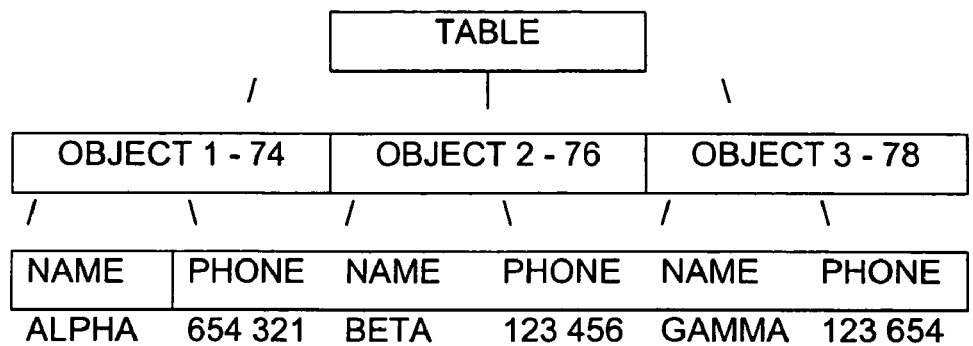
FIG. 12 is a block diagram of a hierarchy of a data table.
Like reference symbols in the various drawings indicate like elements.

In FIG. 12, a hierarchy 70 of a data table with data objects (DO) illustrating an XML-file for the complete table and index (I) 72 is shown. The hierarchy 70 has three data objects 74, 76, 78, each for "name" and "phone". A corresponding XML-file 80 with tags for the complete table and with object tags for object identification, for "name" and for "phone," is also shown. For convenience, closing tags (i.e., "</name" tags) and other standard XML-statements are omitted.

The index 72 provides certain advantages, for example, retrieving is expedited because looking up (510) in the index, reading (520) from the address and converting (540) by a parser do not require parsing non-relevant objects.

The present invention can be used for backup purposes as well. The approach of the present invention is not restricted to read-only objects. The invention can be applied to data objects that are updated, in which new read-only objects are created and a version management tool tracks the actual version. If desired, write-enabled objects can be archived as well. A version management tool tracks the actual version of such write-enabled objects.

The present invention electronically processes data objects, the data objects having data items. The invention includes a means for classifying each data object into a write-enabled object or a read-only object and a means for selectively storing write-enabled data objects in a database or archiving read-only data objects in an archive. For archiving, the process includes a means for converting the data objects to markup objects by one-to-one conversion, wherein each markup object represents data items of the corresponding data object, a means for concatenating the objects to a single data structure that is byte addressable and a means for indexing object identification for each object to addresses of the data structure.

The means for classifying can operate while creating the data objects in a data exchange process by an application computer system. The means for converting can provide the markup objects in extensible markup language (XML), encode numerical data items by character code, add code identification to markup objects, or represent code identification by MilBenum numbers for character sets.

The invention can be implemented in digital electronic circuitry, or in computer hardware, firmware, software, or in combination of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. Accordingly, other embodiments are within the scope of the following claims.

What is claimed is:

1. A method for processing data objects having data items comprising:

classifying each data object into a write-enabled object or a read-only object;
initially selectively storing write-enabled data objects in a database; and
archiving read-only data objects in an archive, an original home of the read-only data objects being in the archive, the archiving comprising:
converting the data objects to markup objects, wherein each markup object represents the data items of the corresponding data object;
concatenating the markup objects to a single data structure that is byte addressable; and
indexing object identification for each markup object to addresses of the data structure.

2. The method of claim 1 wherein classifying is performed while generating the data objects in a data exchange process by an application system.

3. The method of claim 1 wherein the markup objects comprise Extensible Markup Language (XML) objects.

4. The method of claim 1 wherein converting further comprises encoding numerical data items by character code.

5. The method of claim 1 wherein converting further comprises adding code identification to markup objects.

6. The method of claim 5 wherein the code identification is Management Information Base (MIB) numbers.

7. The method of claim 1 wherein converting further comprises compressing the markup objects to compressed objects with length identification.

8. The method of claim 1 wherein indexing further comprises adding a descriptor representing the semantics of the data items in the markup objects to the data structure.

9. The method of claim 8 wherein the descriptor is a document type definition (DTD) schema.

10. The method of claim 8 wherein the descriptor is an XML schema.

11. The method of claim 1 wherein storing further comprises converting, concatenating and indexing write-enabled data objects in the database.

12. A method for archiving data objects having data items comprising:
converting the data objects to markup objects, wherein each markup object represents data items of the corresponding data object;
concatenating the markup objects to a single data structure that is byte addressable; and
indexing object identification for each markup object to addresses of the data structure.

13. The method of claim 12 wherein the markup objects are XML objects.

14. The method of claim 12 wherein converting comprises encoding numerical data items by character code.

15. The method of claim 12 wherein converting comprises adding code identification to markup objects.

16. The method of claim 15 wherein code identification is represented by Management Information Base (MIB) numbers.

17. The method of claim 12 wherein converting further comprises compressing the markup objects to compressed objects with length identification.

18. The method of claim 12 wherein the data structure includes a descriptor representing the semantics of data items in the markup objects.

19. The method of claim 18 wherein the descriptor is a document type definition (DTD) schema.

20. The method of claim 18 wherein the descriptor is an XML schema.

21. A computer program product, tangibly stored on a computer-readable medium, comprising instructions operable to cause a programmable processor to:
provide data objects having data items;
classify each data object into a write-enabled object or a read-only object;
initially selectively store write-enabled data objects in a database; and
archive read-only data objects in an archive, an original home of the read-only data objects being in the archive, the archiving comprising:
convert the data objects to markup objects, wherein each markup object represents the data items of the corresponding data object;
concatenate the markup objects to a single data structure that is byte addressable; and
index object identification for each markup object to addresses of the data structure.

22. The product of claim 21 wherein the instruction to classify is performed while generating the data objects in a data exchange process by an application system.

23. The product of claim 21 wherein the markup objects comprise XML objects.

24. The product of claim 21 wherein the instruction to convert further comprises an instruction to encode numerical data items by character code.

25. The product of claim 21 wherein the instruction to convert further comprises adding code identification to markup objects.

26. The product of claim 25 wherein the code identification is Management Information Base (MIB) numbers.

27. The product of claim 21 wherein the instruction to convert further comprises compressing the markup objects to compressed objects with length identification.

28. The product of claim 21 wherein the instruction to index further comprises adding a descriptor representing the semantics of the data items in the markup objects to the data structure.

29. The product of claim 28 wherein the descriptor is a document type definition (DTD) schema.

30. The product of claim 28 wherein the descriptor is an XML schema.

31. The product of claim 21 wherein the instruction to store further comprises converting, concatenating and indexing write-enabled data objects in with the database.

32. A computer program product, tangibly stored on a computer-readable medium, comprising instructions operable to cause a programmable processor to:
provide data objects having data items;
convert the data objects to markup objects, wherein each markup object represents the data items of the corresponding data object;
concatenate the markup objects to a single data structure that is byte addressable; and
index object identification for each markup object to addresses of the data structure.

33. The product of claim 32 wherein the markup objects are XML objects.

34. The product of claim 32 wherein the instruction to convert comprises encoding numerical data items by character code.

35. The product of claim 32 wherein the instruction to convert comprises adding code identification to markup objects.

36. The product of claim 35 wherein code identification is represented by Management Information Base (MIB) numbers.

37. The product of claim 32 wherein the instruction to convert further comprises compressing the markup objects to compressed objects with length identification.

38. The product of claim 32 wherein the data structure includes a descriptor representing the semantics of the data items in the markup objects.

39. The product of claim 38 wherein the descriptor is a document type definition (DTD) schema.

40. The product of claim 38 wherein the descriptor is an XML schema.

* * * * *